(12) United States Patent
Sonntag

(10) Patent No.: US 11,565,662 B2
(45) Date of Patent: Jan. 31, 2023

(54) PROTECTION SYSTEM, DRIVER ASSISTANCE SYSTEM AND VEHICLE COMPONENT

(71) Applicant: ZF AUTOMOTIVE GERMANY GMBH, Alfdorf (DE)

(72) Inventor: Thorsten Sonntag, Radolfzell (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 101 days.

(21) Appl. No.: 17/098,705

(22) Filed: Nov. 16, 2020

(65) Prior Publication Data

US 2021/0162957 A1  Jun. 3, 2021

(51) Int. Cl.
| | | |
|---|---|---|
| B60S 1/46 | (2006.01) | |
| B60S 1/02 | (2006.01) | |
| H04N 5/217 | (2011.01) | |
| G02B 27/00 | (2006.01) | |

(52) U.S. Cl.
CPC ............ B60S 1/46 (2013.01); B60S 1/023 (2013.01); *G02B 27/0006* (2013.01); *H04N 5/217* (2013.01)

(58) Field of Classification Search
CPC ..... G03B 17/568; G02B 27/0006; B60S 1/56; B60S 1/52; B60S 1/023; B60S 1/46; B60R 2300/80; B60R 2300/101; B60R 11/04
USPC ...................... 359/509; 15/250.001
See application file for complete search history.

(56) References Cited

U.S. PATENT DOCUMENTS

| | | |
|---|---|---|
| 9,880,382 B1 | 6/2018 | Tippy et al. |
| 10,179,549 B2 | 1/2019 | Buss |
| 10,730,485 B2 | 4/2020 | Diedrich et al. |
| 11,169,373 B2 | 9/2021 | Dissette et al. |
| 11,220,241 B2 | 1/2022 | Melon |
| 11,377,073 B2 | 7/2022 | Giraud |
| 2014/0192410 A1* | 7/2014 | Yoshimura .............. B60R 11/04 359/509 |
| 2016/0264064 A1 | 9/2016 | Byrne et al. |
| 2019/0077373 A1 | 3/2019 | Ghannam et al. |
| 2019/0113742 A1 | 4/2019 | Gaucher et al. |
| 2021/0253067 A1 | 8/2021 | Poton et al. |

FOREIGN PATENT DOCUMENTS

| | | |
|---|---|---|
| DE | 20219004 U1 | 3/2003 |
| DE | 10235337 A1 | 2/2004 |
| DE | 102005021672 A1 | 11/2006 |
| DE | 102009052140 A1 | 6/2010 |
| DE | 102014004172 A1 | 9/2014 |
| DE | 102105217781 A1 | 3/2017 |
| DE | 102106101744 A1 | 8/2017 |
| DE | 102016108978 A1 | 11/2017 |

(Continued)

*Primary Examiner* — Katina N. Henson
(74) *Attorney, Agent, or Firm* — Tarolli, Sundheim, Covell & Tummino LLP

(57) ABSTRACT

Protection system for an optical sensor in a motor vehicle and for detecting an environment of the motor vehicle is provided, wherein the protection system comprises at least one cover for the optical sensor, which can be brought into a cover position in which the optical sensor is protected from environmental influences by the at least one cover. The protection system comprises a storage device for a plurality of covers, from which at least one cover can be moved into the cover position.

16 Claims, 1 Drawing Sheet

(56) References Cited

FOREIGN PATENT DOCUMENTS

| | | |
|---|---|---|
| DE | 102016221858 A1 | 5/2018 |
| DE | 102017220252 A1 | 5/2019 |
| WO | 2009101044 A2 | 8/2009 |
| WO | 2019096373 A1 | 5/2019 |

* cited by examiner

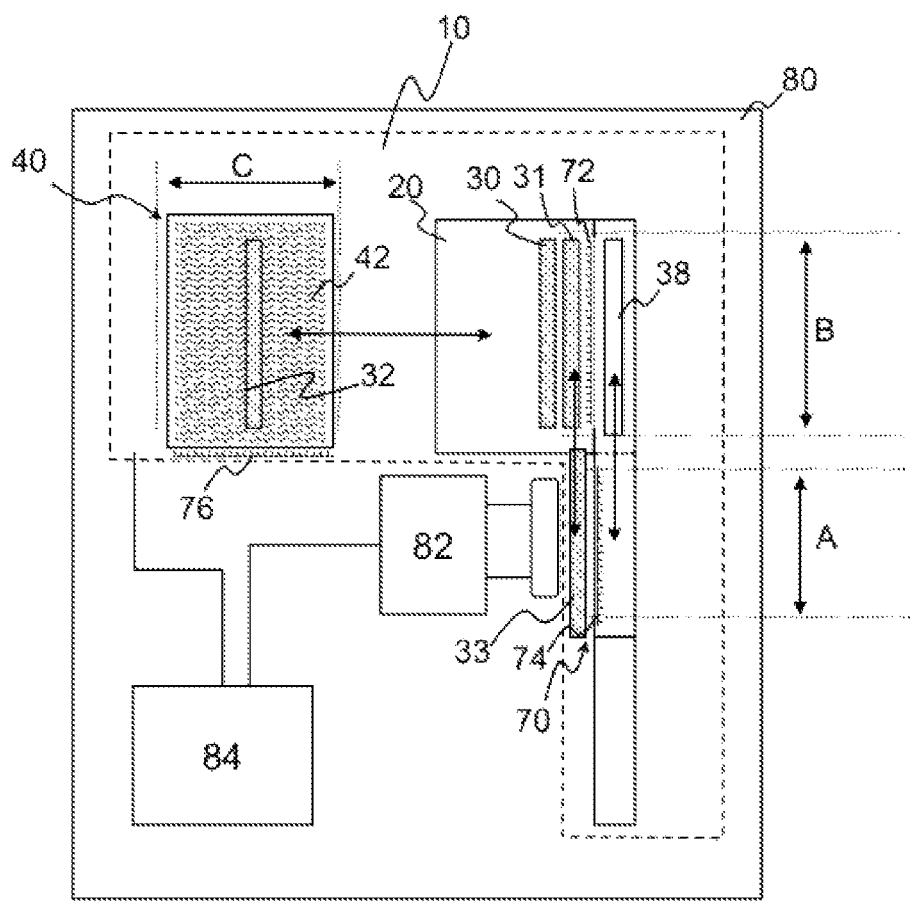

PROTECTION SYSTEM, DRIVER ASSISTANCE SYSTEM AND VEHICLE COMPONENT

RELATED APPLICATION

This application claims priority from German Application No. 10 2019 218 414.6, filed Nov. 28, 2019, the subject matter of which is incorporated herein by reference in its entirety.

BACKGROUND OF THE INVENTION

The invention relates to a protection system for an optical sensor for installation in a motor vehicle, in particular in a passenger car or a truck. The optical sensor is adapted to generate environmental data, such as distance data, image data, object data regarding the environment of the motor vehicle and to provide these data to a driver assistance system according to the invention. In particular, the invention relates to a protection system for a camera sensor or a lidar sensor. The invention also relates to a driver assistance system, in particular a camera and/or lidar data-processing driver assistance system, for a motor vehicle with a protection system for protecting a camera and/or lidar data-generating sensor. Finally, the invention also relates to a vehicle component for mounting on the exterior of a vehicle, such as a bumper, a tailgate, a radiator grill, an exterior mirror or any other part of the outer shell of the motor vehicle.

Various driver assistance systems or automated driving systems require environmental data generated with an optical sensor, such as image data or distance data, which describe the environment of the vehicle equipped with the driver assistance system. As the degree of automation of vehicle operation increases, environmental data must be available in ever higher quality and, if possible, at any time and without interruption. Temporary unavailability or a temporary or gradual decrease in the quality of the image data over a longer period of time, caused by environmental influences such as contamination of the image sensor or icing, can lead to reduced performance of the driver assistance system and endanger vehicle occupants if the driver assistance system is highly dependent on the environmental data or image data.

The quality of the environmental data also depends on the optical transmission quality of the optically transparent component on the outermost side of the vehicle environment in the optical flow from the vehicle environment to the optical sensor. Environmental influences affect this component throughout the entire life cycle of the vehicle, which can affect the optical transmission quality of the outermost component on the side of the vehicle environment in the optical path.

In order to achieve a high detection accuracy, optical components such as lenses, which are expensive in relation to the total price of the optical sensor, regularly form the output and/or input of the optical sensor. To achieve low manufacturing tolerances, these are usually a non-interchangeable part of the sensor.

A protection system for an optical sensor is known from US 2016/0264064 A1, wherein the optical sensor is protected from environmental influences by an optical redirecting cover. The cover is mounted exchangeably. The protection system includes a cleaning nozzle through which a cleaning fluid can be sprayed onto the cover.

EP 3 230 128 B1 shows a camera assembly held together with a cleaning unit on a carrier that can be moved from a resting state, in which the camera is protected from environmental influences, to a recording position, in which the camera unit is used for its intended function. The camera assembly also includes a cleaning unit that can be used to apply a cleaning fluid to a lens of the camera unit.

SUMMARY OF THE INVENTION

It is the task of the invention to overcome the disadvantages of the prior art, in particular to provide a protection system, a driver assistance system and a vehicle component, which each increase the availability and quality of the environmental data of an optical sensor over the entire life cycle of a vehicle.

This task is solved by the subjects of the independent claims. Accordingly, a protection system for an optical sensor is provided, wherein the sensor is mountable or mounted in a motor vehicle and is adapted to detect an environment of the motor vehicle and the protection system comprises a cover for the optical sensor which is translucent, preferably transparent, in particular at least in the wavelength range relevant for the sensor. The cover can be brought into a cover position in which the optical sensor is protected from environmental influences by the cover. According to the invention, the protection system comprises a storage device for a plurality of preferably transparent covers that are translucent at least in the wavelength range relevant for the sensor, from which the at least one cover can be moved into the cover position. In the cover position, the cover is the outermost component on the environment side with respect to the optical path from the environment of the motor vehicle to the optical sensor. In particular, the cover is designed separately from a part, such as a lens, which forms a sensor input and/or sensor output and is structurally to be assigned to the optical sensor. The cover is in any case transparent for the light components to be received and/or emitted by the optical sensor. The storage device contains a plurality of covers, in particular of the same dimensions, preferably of the same type and/or technically identical, of which at least one in each case is arranged so as to be movable from the storage device into the cover position. By keeping a plurality of covers ready in case of contamination or optical impairment of the cover during its life cycle, an unsoiled or unimpaired cover can be brought from the storage device into the cover position in order to restore the original imaging quality of the optical sensor.

The optical sensor that provides environmental data is in particular a camera sensor, such as a camera equipped with a CMOS or CCD sensor or a PMD camera, or a lidar sensor.

In a special embodiment, the cover can be moved back into the storage device. With this measure a circulation system is formed, which allows a reuse of the cover.

In a special embodiment, the protection system includes a cleaning device that provides a cleaning position for at least one cover. In particular, the protection system is equipped with a transport device, such as a rotating mechanism or a rail system, by means of which the cover can be moved from the cover position to the cleaning position. The transport device can be driven electrically, by spring force, gravity or fluid flow.

The cleaning device is preferably dimensioned and adapted in such a way that a plurality of covers can be cleaned at the same time. With the help of the cleaning station, the transmission quality of at least one soiled cover and thus the image data quality can be reproducibly restored for a long period of time. By providing a cleaning position and a plurality of covers, the optical sensor can be operated and a cover can be cleaned at the same time. Synchronous cleaning of a plurality of covers enables long and thorough cleaning processes without the cleaning device for receiving further dirty covers being blocked.

In particular, the cleaning device operates on a first-in-first-out principle. This ensures that cleaning is possible for the longest possible time while at the same time ensuring high availability of covers.

In a special embodiment, the protection system comprises a cleaning device with a wet cleaning station. In particular, the wet cleaning device is adapted to wet the entire surface of a cover with a cleaning fluid in the cleaning position. In particular, the wet cleaning station comprises a flexible fluid-storing carrier, such as a sponge, which is movably arranged over the cover. Alternatively, or additionally, the wet cleaning station comprises an immersion bath. In particular, the immersion bath is heatable. Preferably, the wet cleaning station comprises an ultrasonic cleaning system. Alternatively, or additionally, the wet cleaning device comprises at least one nozzle through which a cleaning liquid can be sprayed, preferably at high pressure, onto at least one, in particular a plurality of covers located in the cleaning position. In particular, the wet cleaning device is connected to a tank for a cleaning fluid. Preferably, the wet cleaning device is connected to a tank of a window cleaning system of the motor vehicle. With the help of the wet cleaning station a thorough cleaning is achieved. The complete wetting of the cover ensures a homogeneous change of the transmission properties of the covers by the cleaning processes over the life cycle. By using an immersion bath, longer exposure times of the cleaning solution to the covers can be achieved and thus a gentler and more thorough cleaning. By heating the cleaning liquid and/or the immersion bath, the cleaning time is reduced while maintaining the same cleaning performance. In particular, the heating can be switched on optionally in case of temporarily high availability requirements or rapid contamination. One or more of the aforementioned measures enables energy-saving operation of the protection system.

In a special embodiment, the covers in the storage device are each arranged so that they can be moved from a storage device B to cover position A and/or from storage position B to cleaning position C. In particular, the protection system comprises a transport device, such as a rail system or a guiding device, which enables the covers to be moved from a respective storage position into the cover position and into the cleaning position. With this measure a cycle and a reusability of the covers is achieved, whereby availability and cleaning performance are increased by the storage position.

In a special embodiment, the storage device is designed as a revolver magazine. In particular, the revolver magazine is rotatably mounted with respect to a rotation axis preferably aligned parallel to the optical path of the optical sensor. Alternatively, or additionally the storage device can comprise a stacking magazine. Preferably, the storage device is designed as a revolver magazine with a plurality of magazine chambers, where one respective magazine chamber is designed as a stacking magazine. This means that a plurality of covers is arranged as a stack in a rotatably mounted carrier in a respective rotary position from which covers can be separated. A revolver magazine enables a particularly simple provision of a cover from a supply position to the cover position. In particular, the transport device is designed in such a way that a cover can be moved from the storage position of the revolver and/or stack magazine into the cleaning position and/or the cover position. For this purpose, the storage device can be moved into a delivery position leading to the cleaning position and/or the cover position, in which one or more of the covers are separated and can be moved by the transport device into the cleaning position and/or cover position.

In a special embodiment, the protection system includes an ejection device, which is adapted to move the at least one cover away from the protection system from the cover position. The ejection device may also be designed in such a way that one or more covers can be moved out of the storage device, away from the protection system. Thus, covers whose optical transmission is permanently impaired can be removed from the circuit and do not take up space or cleaning capacity. In this embodiment, the covers can be made of a biodegradable material. The ejection device can be driven electrically, by spring force, gravity or air flow.

In one special embodiment, the protection system comprises a heater to heat at least one of the covers in the storage position, the cover position and/or the cleaning position. In particular, the heater is adapted to heat each of the covers. In particular, the heater is designed to heat the storage position, the cover position and the cleaning position. In particular, the heater comprises a partial heating system for heating a cleaning liquid and/or an immersion bath of the cleaning device. Preferably, the heater is designed as a heating wire. Alternatively, or additionally, the heater includes an infrared heating element. Alternatively, or additionally, the heater can be connected to a heating system of the motor vehicle. With the help of the heater a high optical transmission quality in winter weather conditions is guaranteed.

In one special embodiment, the cover is arranged so that it can be moved transversely, preferably perpendicular to the optical path of the optical sensor, from a storage position to the cover position or from the cover position to the storage position. By moving the cover transversely or perpendicularly to the optical path, the cover can be changed without having to interrupt the function of the optical sensor for a longer time.

In one special embodiment, the storage device has a maintenance opening through which a plurality of covers can be replaced. In particular, the covers can be replaced individually. Preferably, the storage device comprises a carrier or magazine for a plurality of covers, which can be removed and inserted as an exchange module via the maintenance opening. Preferably, the maintenance opening can be closed by means of a maintenance flap. The easy replacement of a plurality of covers increases the maintainability of the protection system and the vehicle equipped with it.

The invention also relates to a driver assistance system for a motor vehicle, which comprises an optical sensor for providing environmental data of the motor vehicle as well as a protection system, in particular designed according to the invention, with a plurality of covers, at least one of which can be brought into a cover position to protect the optical sensor from environmental influences, and a control unit adapted and arranged to detect contamination of the cover in the cover position based on a change in data provided by the optical sensor, to move the cover from a cover position to a storage position, and to move another of the a plurality of covers to the cover position.

In particular, the driver assistance system comprises a control unit that is arranged and adapted to evaluate a change in the environmental data with respect to a constant section of the environment. From the change of a section of the environment expected to be constant, a change or impairment of the optical path can be deduced, for example by a contamination of the cover which is currently in the cover position. Preferably, the control unit is arranged and adapted to move a cover from the storage position to the cover position and the cover in the cover position from the cover position to the storage position and/or to the cleaning position.

Finally, the invention also relates to a vehicle component for mounting on the exterior of a vehicle, wherein the vehicle component comprises an optical sensor and a protective system, in particular designed according to the invention, with a cover for protecting the optical sensor from environmental influences. In particular, the vehicle component is a front apron or a radiator grill, for example with an integrated camera sensor.

BRIEF DESCRIPTION OF THE DRAWINGS

Further features, advantages and characteristics of the invention are explained by means of the description of preferred embodiments of the invention with reference to the figures, in which FIG. 1 shows an embodiment of a vehicle component according to the invention with a protection system according to the invention.

DESCRIPTION

FIG. 1 shows an example of a protection system 10 integrated in a vehicle component 80, for example a front bumper. The protection system 10 protects an optical sensor, namely in FIG. 1 the camera sensor 82, against environmental influences acting from outside on the optical input of the camera sensor 82. The camera sensor 82 is connected to a control unit 84. Control unit 84, camera sensor 82 and protection system 10 are part of a driver assistance system not shown in detail, for example a camera-based lane change assistant.

Protection system 10 comprises a storage device 20, which is shown here as an example and only schematically as a stack magazine. In the storage device 20 a plurality of covers 30, 31 are stored, which can be moved from a storage position B to a cover position A by means of a transport device not shown in detail, such as a slide rail. One of the covers 33 shown in the cover position is arranged in such a way that an optical input or an optical output of the optical sensor, here the optical input of the camera sensor 82, is protected by environmental influences acting from outside with respect to the optical path.

The protection system 10 also has a parking position cover 38 which cuts the optical path and protects both the optical sensor, in FIG. 1 the camera sensor 82 and the unspecified transport device and the cover 33 in cover position A from environmental influences. The parking position cover 38 is additionally placed in front of cover position A when a motor vehicle in which protection system 10 is installed is put into a resting state, such as ignition off. In such a resting state, usually no function of the optical sensor is required, so that additional protection by the parking position cover 38 leads to an increase of the lifetime of the protection system 10 and the optical sensor.

The protection system 10 also features a cleaning device 40, which is designed as an immersion bath 42. Via an unspecified inlet and outlet opening and an unspecified transport device, at least one of the pluralities of covers of the storage device 20 enters an immersion bath 42 of the cleaning device 40 in order to be freed from contamination.

The cleaning device 40 is dimensioned such that a plurality of covers can be cleaned at the same time.

The protection system 10 also includes a heating system which comprises a plurality of heating zones 74, 72, 76. A first heating zone 72 is provided in the storage device 20 and is designed in such a way that it heats at least one of the plurality of covers in storage position B. In particular, the heating zone 72 is designed in such a way that at least the cover 31 is heated, which is the next one to be brought from storage position B to cover position A. In another embodiment not shown, heating zone 72 is designed in such a way that all covers held in the storage device are heated.

A further heating zone 76 is provided for heating the immersion bath 42. A third heating zone 74 is provided in the area of the camera sensor 82 and ensures that winter weather conditions have no function-relevant effects on a cover 31 or parking position cover 38 located in cover position A. Heater 74 is designed as a heating wire or heating mesh that is permeable to the sensor. In an alternative or additional embodiment not shown in detail, the heater 70, in particular one or more of the heating zones 72, 74, 76 may be connected to a heating system of a motor vehicle equipped with the protection system 10.

The control unit 34 of the driver assistance system monitors an image data stream of the camera sensor 82 for changes in the optical path. For this purpose, image processing algorithms can be used to identify constant image sections and on the constant image sections detail changes attributable to changes in the optical path can be identified. If such a change is identified by the control unit 84, the control unit 84 emits at least one a signal that causes a replacement of the cover in cover position A by a cover in storage position B. Subsequently, the control unit 84 generates a signal that causes the cover A removed from the cover position to be moved to the cleaning position C in the cleaning device 40. The cleaning process in the cleaning device 40 is controlled and monitored by the control unit 84. After the cover has been cleaned, the cover is moved from cleaning position C back into the storage device.

The storage device 20 usually contains a plurality of cleaned covers, so that a dirty cover can be replaced at any time without materially affecting the functional operation of the optical sensor.

REFERENCE SIGNS

10 Protection system
20 Storage device
30, 31, 32, 33 Cover
38 Parking position cover
40 Cleaning device
42 Immersion bath
70 Heating
72, 74, 76 Heating zones
80 Vehicle component
82 Optical sensor
84 Control unit
A Cover position
B Storage position
C Cleaning position

The invention claimed is:

1. A protection system (10) for an optical sensor in a motor vehicle and for detecting an environment of the motor vehicle, the protection system (10) comprising a storage device (20) for a plurality of covers (30, 31, 32), the protection system (10) being configured such that at least one of the covers (30, 31, 32) is moved from the storage device (20) to a cover position (A), while at least one other of the covers remains in the storage device, the optical sensor being protected against environmental influences by the at least one cover (30, 31, 32) in the cover position (A).

2. The protection system (10) according to claim 1, wherein the at least one cover (30, 31, 32) can be moved from the cover position (A) back into the storage device (20).

3. The protection system (10) according to claim 1, wherein the protection system (10) comprises a cleaning device (40) providing a cleaning position (C) for at least one of the plurality of covers (30, 31, 32).

4. The protection system (10) according to claim 1, further comprising a cleaning device (40) having a wet cleaning station.

5. The protection system (10) according to claim 1, wherein the covers (30, 31, 32) are arranged in the storage device (20) so as to be movable from a storage position (B) into the cover position (A), movable from the storage position (B) into a cleaning position (C), or moveable from the storage position (B) to each of the cover position (A) and the cleaning position (C).

6. The protection system (10) according to claim 5, wherein the storage device is designed as a revolver, as a stack magazine, or as a revolver with a stack magazine.

7. The protection system (10) according to claim 1, further comprising an ejection device adapted to move the at least one cover (30, 31, 32) from the protection system away from the cover position (A).

8. The protection system (10) according to claim 1, wherein the protection system (10) comprises a heater (70) for heating one or more of the covers (30, 31, 32) in at least one of the storage position (B), the cover position (A) and a cleaning position (C).

9. The protection system (10) according to claim 1, wherein the at least one cover can be moved transversely to an optical path of the optical sensor from the storage device (20) into the cover position (A).

10. The protection system (10) according to claim 1, wherein the storage device (20) has a maintenance opening through which a plurality of covers (30, 31, 32) can be replaced.

11. A driver assistance system for a motor vehicle, comprising an optical sensor (82) for providing environmental data of the motor vehicle, a protection system (10) designed in particular according to claim 1 and having a plurality of covers (30, 31, 32), at least one of which can be brought into a cover position (A) for protecting the optical sensor from environmental influences, and a control unit (84) which is adapted and arranged to detect a contamination of the cover (30, 31, 32) in the cover position on the basis of a change in data provided by the optical sensor, to bring the cover (30, 31, 32) from a cover position (A) to a storage position (B) and to bring another of the plurality of covers (30, 31, 32) to the cover position (A).

12. A vehicle component (80) for mounting in the outer area of a motor vehicle, wherein it has an optical sensor and a protection system (10) designed in particular according to claim 1 with a cover (30, 31, 32) for protecting the optical sensor from environmental influences.

13. The protection system (10) according to claim 1, wherein light travelling along an optical path of the optical sensor passes through the at least one cover (30, 31, 32) in the cover position (A).

14. The protection system (10) according to claim 1, wherein the covers (30, 31, 32) are translucent.

15. The protection system (10) according to claim 1, wherein the covers (30, 31, 32) are transparent.

16. The protection system (10) according to claim 1, further comprising a parking position cover (38) that cuts the optical path and protects both the at least one cover (30, 31, 32) that is in the cover position A and the optical sensor from environmental influences.

* * * * *

UNITED STATES PATENT AND TRADEMARK OFFICE
CERTIFICATE OF CORRECTION

| | |
|---|---|
| PATENT NO. | : 11,565,662 B2 |
| APPLICATION NO. | : 17/098705 |
| DATED | : January 31, 2023 |
| INVENTOR(S) | : Thorsten Sonntag |

It is certified that error appears in the above-identified patent and that said Letters Patent is hereby corrected as shown below:

On the Title Page

Insert Item (30): Foreign Application Priority Data: --DE 10 2019 218 414.6 filed on November 28, 2019--

Signed and Sealed this
Twenty-second Day of August, 2023

Katherine Kelly Vidal
*Director of the United States Patent and Trademark Office*